United States Patent
Umegørd

(10) Patent No.: US 11,464,210 B2
(45) Date of Patent: Oct. 11, 2022

(54) METHOD AND CONTROL UNIT FOR LOCATING ANIMALS

(71) Applicant: DELAVAL HOLDING AB, Tumba (SE)

(72) Inventor: Anders Umegørd, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 716 days.

(21) Appl. No.: 16/325,594

(22) PCT Filed: Aug. 17, 2017

(86) PCT No.: PCT/SE2017/050829
§ 371 (c)(1),
(2) Date: Feb. 14, 2019

(87) PCT Pub. No.: WO2018/034610
PCT Pub. Date: Feb. 22, 2018

(65) Prior Publication Data
US 2019/0174723 A1    Jun. 13, 2019

(30) Foreign Application Priority Data

Aug. 17, 2016   (SE) .................................. 1651109-9

(51) Int. Cl.
*A01K 29/00*     (2006.01)
*A01K 11/00*     (2006.01)

(52) U.S. Cl.
CPC .......... *A01K 29/005* (2013.01); *A01K 11/008* (2013.01); *A01K 11/001* (2013.01)

(58) Field of Classification Search
CPC ... A01K 29/005; A01K 11/008; A01K 11/001
See application file for complete search history.

(56) References Cited

U.S. PATENT DOCUMENTS 5,791,294 A * 8/1998 Manning .............. A01K 11/008
119/721
6,113,539 A   9/2000 Ridenour
(Continued)

FOREIGN PATENT DOCUMENTS

EP    0 758 752 A1    2/1997
EP    2 832 215 A1    2/2015
(Continued)

OTHER PUBLICATIONS

SE Search Report, dated Mar. 22, 2017, from corresponding SE application No. 1651109-9.
(Continued)

*Primary Examiner* — Tien Q Dinh
*Assistant Examiner* — Katelyn T Truong
(74) *Attorney, Agent, or Firm* — Nixon & Vanderhye

(57) ABSTRACT

A method and system for assisting a human in detecting an exception animal, for which an abnormal measurement value has been detected, wherein a geographical position is obtained of the exception animal, a geographical position if obtained of a user equipment of the human, a distance is determined between the obtained geographical position of the exception animal and the obtained geographical position of the user equipment, and when the determined distance is smaller than a threshold limit, an indication is sent to the user equipment confirming the proximate presence of the exception animal.

14 Claims, 8 Drawing Sheets

(56) References Cited

U.S. PATENT DOCUMENTS

| | | | | |
|---|---|---|---|---|
| 7,918,185 B2* | 4/2011 | Araki | ................... | A01K 11/008 119/174 |
| 9,131,346 B1 | 9/2015 | Ware et al. | | |
| 9,197,995 B1 | 11/2015 | Deangelis et al. | | |
| 9,974,284 B2 | 5/2018 | Harty et al. | | |
| 10,045,511 B1* | 8/2018 | Yarden | ................... | A61B 5/1118 |
| 2002/0010390 A1 | 1/2002 | Guice et al. | | |
| 2009/0009388 A1* | 1/2009 | Wangrud | .............. | A01K 11/008 342/357.55 |
| 2009/0066568 A1* | 3/2009 | Britz | .................... | A01K 11/008 342/357.36 |
| 2009/0187392 A1* | 7/2009 | Riskey | ................. | A01K 11/008 703/11 |
| 2010/0030036 A1* | 2/2010 | Mottram | .............. | A61D 17/002 600/301 |
| 2011/0298619 A1* | 12/2011 | O'Hare | ................ | A01K 11/008 340/573.1 |
| 2012/0111286 A1* | 5/2012 | Lee | ...................... | A01K 11/008 119/719 |
| 2013/0124321 A1 | 5/2013 | Yamane et al. | | |
| 2013/0285815 A1 | 10/2013 | Jones, II | | |
| 2016/0135433 A1 | 5/2016 | Harty et al. | | |
| 2016/0165851 A1 | 6/2016 | Harty et al. | | |
| 2017/0156288 A1* | 6/2017 | Singh | ................... | A01K 29/005 |
| 2018/0235184 A1 | 8/2018 | Harty et al. | | |

FOREIGN PATENT DOCUMENTS

| | | | | |
|---|---|---|---|---|
| KR | 102090010 B1 * | 3/2020 | ........... | G06K 9/6267 |
| WO | 2007/103886 A2 | 9/2007 | | |
| WO | 2011/082208 A2 | 7/2011 | | |
| WO | 2013/005213 A1 | 1/2013 | | |
| WO | 2014/199363 A1 | 12/2014 | | |

OTHER PUBLICATIONS

International Search Report and Written Opinion, dated Nov. 17, 2017, from corresponding PCT application No. PCT/SE2017/050829.

Office Action issued in European Patent Application No. 17 761 337.9 dated May 26, 2020.

* cited by examiner

METHOD AND CONTROL UNIT FOR LOCATING ANIMALS

TECHNICAL FIELD

This document discloses a method and a system. More particularly, a method and a system are described, for assisting a human in detecting an exception animal, for which an abnormal measurement value has been detected.

BACKGROUND

When engaged in agricultural activities involving animals, such as on a dairy farm, it is a challenge to find the exception animals, like animals predicted to be in heat, or animals eligible to be in heat; as well as sick animals or animals with an otherwise abnormal state or behaviour. It may also be that a sensor connected to a collar of a particular animal is malfunctioning, or has a battery that has to be exchanged, etc.

Modern dairy farms have automated systems that helps detecting animals in heat (in order to inseminate them) using for example activity meters. There are also various other known methods to detect an animal in heat. These systems also keep track on which animals that are eligible, i.e. that theoretically can be in heat at a given moment and need to be observed to identify the heat start. These pieces of information are stored within such a system and are accessible from a user interface that may be a Personal Computer (PC) or a handheld device, in many herd management systems. Some systems also support animal positioning tools, typically using triangulation, to locate where in the barn certain animals are, given that the geographical boundaries of the barn are known.

However, typically, manual observations are needed in order to confirm animals, suspected by the system to be in heat (or to be sick). This is made by a farmer or other human by making a round through the barn, inspecting the animals indicated by the system. This is however time consuming and it would be desired to reduce the time spent on this daily routine, as it multiplies over time.

Document WO 2014199363 A1 presents a method for communication between a monitoring device on an animal, and a smart phone of a farmer via a short range wireless communication. When the farmer passes the animal and put the smart phone close to the monitoring device, he/she receives information concerning the animal.

However, the range of the short range wireless communication (low energy Bluetooth or Near Field Communication) described in the document is only some centimetres. The farmer thereby has to approach every individual animal and position the smart phone very close to the wireless transmitter of the animal and keep it there during the communication, which may be difficult as the animal may move the body and the head. The described process is more time consuming than a manual observation made by the farmer by walking through the barn, inspecting the animals. The solution according to the document does not assist the farmer in detecting that an animal is in heat, ill or otherwise has deviating measurement values, i.e. information is transmitted from the monitoring devices of any animal, independently if the animal has deviating measurement values or not.

It is a problem for the farmer/other human at a farm, to find and identify the exception animals such as e.g. animals indicated to be in heat by the system, in particular in case the herd is large. The animals may often have a high degree of autonomy to stroll around in the barn, and to choose her time of milking freely during the day, which may aggravate the farmer's endeavourments to find the particular animal and unnecessary delay the discovery of the exception animal.

SUMMARY

It is therefore an object of this invention to solve at least some of the above problems and facilitate for a human to detect an exception animal.

According to a first aspect of the invention, this objective is achieved by a system for assisting a human in detecting an exception animal, for which an abnormal measurement value has been detected, comprising a control unit. The control unit is configured to obtain a geographical position of the exception animal. Further, the control unit also is configured to obtain a geographical position of a user equipment of the human. In addition, the control unit is configured to determine a distance between the obtained geographical position of the exception animal and the obtained geographical position of the user equipment. The control unit is configured to generate a command signal to the user equipment to output an indication confirming the presence of the exception animal, when the determined distance is smaller than a threshold limit.

According to a second aspect of the invention, this objective is achieved by a method executed in a control unit of a system for assisting a human in detecting an exception animal, for which an abnormal measurement value has been detected. The method comprises obtaining a geographical position of the exception animal. Further, the method also comprises obtaining a geographical position of a user equipment of the human. The method additionally comprises determining a distance between the obtained geographical position of the exception animal and the obtained geographical position of the user equipment. Also, the method furthermore comprises outputting an indication on the user equipment, confirming the presence of the exception animal, when the determined distance is smaller than a threshold limit.

Thanks to the described aspects, the human may be notified when an animal for which an exceptional value has been detected by the system is situated close to the human. Thereby, the human may check exception animals while passing, performing other assignments in the barn. Thus the human saves time, as he/she fast could find exception animals of the herd. Further, appropriate measures may be taken regarding the exception animal as fast as the human passes close by, instead of having to wait until the human makes a dedicated round through the barn, inspecting the animals indicated by the system.

Thereby the time spent on the daily work on a dairy farm (specifically in the context of finding animals in heat: reduce the number of animals that should be observed) by the human. Thanks to the described method, the human gets notified automatically that any animal that needs observation is in the very neighbourhood of the human.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a method, and a system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
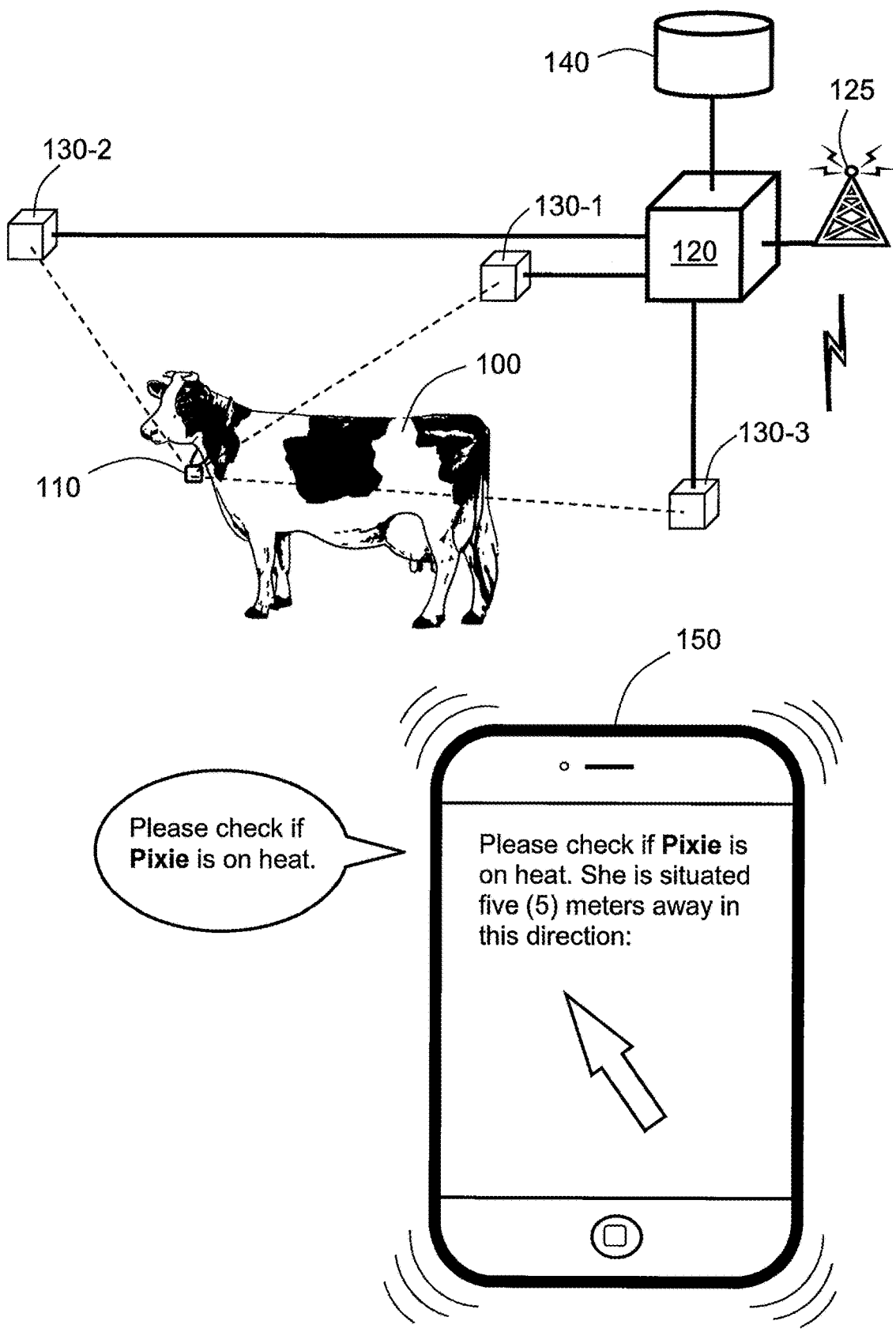
FIG. 1 illustrates an example of a system for assisting a human in detecting an exception animal, according to an embodiment of the invention.

FIG. 1 illustrates a scenario with an exception animal 100 comprised in a herd of animals. A locational device 110 may be attached to the exception animal 100 in some embodiments.

"Exception animal" within the present context is to be interpreted in broad sense. Some examples of an exception animal 100 is an animal in heat (which may be detected e.g. by noticing decreased milk production; increased movement pattern; decreased appetite; increased body temperature; increased progesterone level in the blood/urine and/or by keeping track of the oestrous cycle of the animal); an animal suspected to be ill (which may be detected e.g. by noticing decreased milk production; decreased movement pattern; decreased appetite; increased body temperature); and/or an animal wearing a transponder or sensor which is malfunctioning, for example. Other examples of an "exceptional animal" may be an animal filed in the wrong group, or an animal known to be violent, for example.

"Animal" may be any arbitrary type of animal such as e.g. a domesticated animal; however, the herein provided non-limiting examples primarily relates to milk and/or meat producing animals such as cow, goat, sheep, camel, dairy buffalo, yak, etc.

The exception animal 100 has a locational device 110 attached to the body, e.g. in a necklace around the neck of the animal 100, under the hide of the animal 100, as ear tags and/or around any of the legs. The locational device 110 may comprise an identifying animal unit, i.e. a transponder comprising an identity reference of the animal 100. The locational device 110 may emit wireless signals which may be received by a control unit 120 via a set of wireless signal receivers 130-1, 130-2, 130-3, in some embodiments, such as e.g. three or more wireless signal receivers 130-1, 130-2, 130-3. The control unit 120 may determine the location of the locational device 110 (and thereby also of the exception animal 100), e.g. via triangulation or trilateration, and keep track of the exception animal 100 and possibly all animals of the herd in a database 140. The control unit 120 may subscribe to information from various sources and sensors, including the locational device 110. Various measured data associated with the exception animal 100, and possibly all animals of the herd may thus be continuously stored, e.g. with a time stamp, in the database 140, such as e.g. milk yields, activity, rumination, resting, feed intake, etc. The control unit 120 may then deduce when the animal 100 is possibly in heat, eligible to be in heat or if it is of exceptional interest for other reason (illness etc.).

Further, the control unit 120 is connected to a transceiver 125, configured to transmit and receive wireless signals to/from a User Equipment (UE) 150 which may belong to a human such as e.g. a farmer or other person working at the farm; or a veterinarian, agronomist, biologist, zoologist, ecologist, mammologist, domestic animal researcher or other similar human who temporarily is visiting the farm.

Such wireless communication interface may comprise, or at least be inspired by wireless communication technology such as Wi-Fi, Wireless Local Area Network (WLAN), Ultra Mobile Broadband (UMB), Bluetooth (BT) to name but a few possible examples of wireless communications in some embodiments. The communication may alternatively be made over a wireless interface comprising, or at least being inspired by radio access technologies such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (EUTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), or similar, just to mention some few options, via a wireless communication network.

The UE 150 may be e.g. a cellular mobile telephone, a stationary or portable computing device, a pair of intelligent glasses, a smart contact lens, an augmented reality device, a smart watch or similar device having a user interface and wireless communication ability.

The control unit 120 may obtain the position of the UE 150 over the wireless communication interface, possibly determined by a satellite navigation system such as the Navigation Signal Timing and Ranging (Naystar) Global Positioning System (GPS), Differential GPS (DGPS), Galileo, GLONASS, or the like by the UE 150. Alternatively, the UE 150 and/or the human may carry a locational device 110, for enable localisation by the control unit 120, as illustrated in FIG. 3B.

The geographical position of the UE 150 may alternatively be determined, e.g. by having transponders positioned at known positions around the barn and a dedicated sensor in the UE 150, or at the human, for recognising the transponders and thereby determining the position; by receiving a Bluetooth beaconing signal, associated with a geographical position, or other signal signatures of wireless signals such as e.g. by triangulation of signals emitted by a plurality of fixed base stations with known geographical positions. The position may alternatively be entered manually by the human in some alternative embodiments.

By combining the position of the UE 150 with the position of the exception animal 100, the human may be notified by the control unit 120 when the UE 150/human is in a vicinity of the exception animal 100. A message may then be outputted on the UE 150, e.g. as visual information, as an audio message, as a tactile signal or a combination thereof, encouraging the human to check the state of the exception animal 100 while being in the immediate neighbourhood. In case a plurality of people is working in the barn or with the herd, a broadcast may be made to the plurality of humans/farmers and their respective associated UEs.

Possibly, further information may be provided in the message in order to enable the human to identify the exception animal 100, such as a name/id number, a direction from the UE 150 to the animal 100, a distance between the UE 150 to the animal 100, etc.

Thereby, the human/farmer may check the state of the exception animal 100 while passing or working with other assignments. Thereby the human/farmer saves time. Further, appropriate measures may be taken regarding the exception animal 100 as fast as the human/farmer passes close by, instead of having to wait until the human/farmer makes a dedicated round through the barn, inspecting the animals indicated by the system.

Thereby the time spent on the daily work on a dairy farm (specifically in the context of finding animals in heat: reduce the number of animals that should be observed) by the human. Thanks to the described method, the human gets notified automatically that any animal 100 that needs observation is in the very neighbourhood of the human—or that the system in real time or semi-real time notifies that an animal 100 that has been in immediate neighbourhood is matching the sought conditions, although it did not some minutes ago.

The barn layout and geographical boundaries may be entered in the control unit 120 of the system using either GPS from the UE 150 or through an associated animal unit 110, by as a configuration step, walking through the environment with the UE 150, or imported from a drawing, in some embodiments.

The UE 150 may be setup to select exception animals 100 that fulfil certain conditions, like suspected to be in heat (SH) or eligible in heat (EH) and conversely, exclude other animals that is not eligible to be in heat, like just inseminated (I), fresh—less than a predefined number of days since calving—(F), already pregnant (P), cull-flagged (C). Other conditions could be suspected to be ill (SI) or any user defined flag. This information may be kept in the database 140 and may be extracted by the control unit 120 and provided to the human via the UE 150.

In an example of a user scenario, the human may walk through the herd, or part of the herd, with the UE 150 to look for animals in heat. Instead of looking at all animals in the herd, the human will, when walking by the animals, be notified as soon as an exception animal 100 is in the very neighbourhood of the human.

As, given that the animals have a 21-day heat cycle, not more than 14% (the expected heat day plus one day before and after) of the animals are theoretically eligible to be in heat—and as pregnant animals, just inseminated animals etc., all can be excluded from these 14%, this will make the time spent on heat watch much more efficient than if all animals in a group of animals should be observed or, if the human would have a list of which animals to check, but still would have to check every animal manually to see which animal it is and if it is on the list.

In an alternative scenario, the human may not perform any explicit observation work. Instead the human may be involved in other activities in the barn, like milking, but is carrying the UE 150 and gets notification that an exception animal 100 is situated in the immediate neighbourhood, which deserves attention, such as e.g. suspected to be in heat, suspected to be ill, etc.

Instead of dealing with the exception animal 100 later and specifically, the human can do a first and immediate observation, which can reduce the work that otherwise would need to be scheduled. One scenario is that an animal 100 may have been in the immediate neighbourhood for some time, but at a given point, the set of information in the database 140 of the superior system may be updated, making the animal fulfilling the conditions, like suspected to be in heat (SH) and thus the UE 150 will notify the human. This may be in a milking facility, where the exception animal 100 before the milking was not filed as suspected in heat (SH) or ill (I), but as soon as the information set is updated in the database 140 by the control unit 120, for example milk data, activity or rumination, etc. The control unit 120 may deduce that the animal 100 now fulfils a criteria set, which may trigger signalling of a wireless signal, via the transceiver 125 to the UE 150 and thereby notify that the exception animal 100 needs to be observed.

Figure 2:
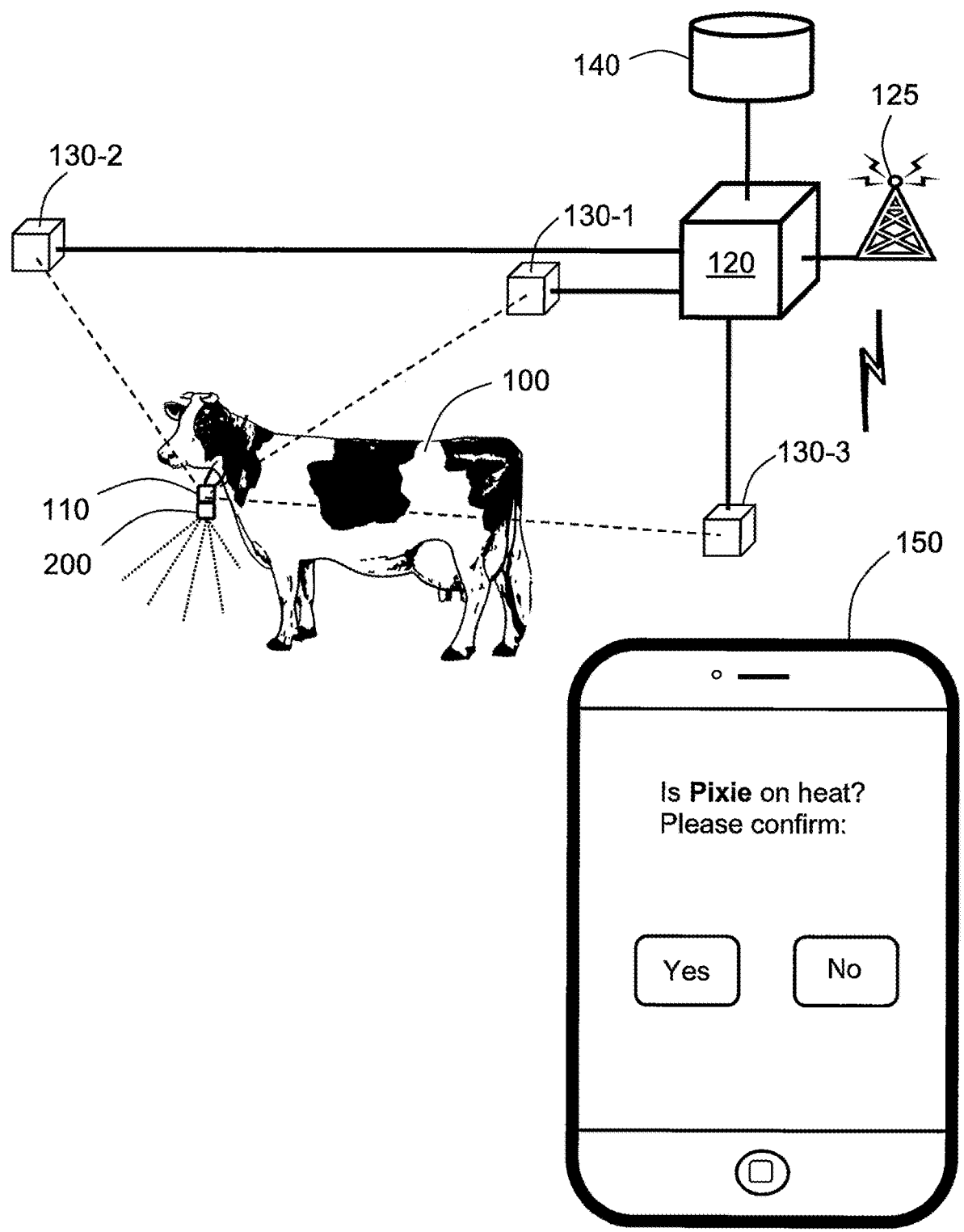
FIG. 2 illustrates yet an example of a system for assisting a human in detecting an exception animal, according to an embodiment of the invention.

FIG. 2 illustrates a system substantially as previously described in FIG. 1. A difference is that an alerting device 200 is situated on the exception animal 100, e.g. on a necklace of the exception animal 100 or otherwise arranged on the exception animal 100, or in the close vicinity of the animal.

In some embodiments, the alerting device 200 may comprise e.g. a lighting device such as a diode or a lamp, a sound emitting device such as a loudspeaker, or similar.

The control unit 120 may in some embodiments emit a command via a wireless signal to activate the alerting device 200, approximately simultaneously with generating and emitting a command signal to the UE 150 to output an indication confirming the presence of the exception animal 100; e.g. by enlighten or flashing with the lighting device, emitting a sound by the sound emitting device, or a combination thereof. It thereby becomes easy for the human to identify the exception animal 100, thereby further facilitating the work of the human.

Further, in the illustrated example, the human may confirm, or alternatively deny the state of the exception animal 100, e.g. by a graphical communication interface on the UE 150. The confirmation/denial may be received by the control unit 120 via the transceiver 125. The control unit 120 may store the received confirmation/denial, associated with a unique identity reference of the exception animal 100 in the database 140. It is thereby avoided that the human/UE 150 is alerted concerning the same animal repeatedly, every time he/she passes the exception animal 100.

In other embodiments, the human may add further information to the file of the exception animal 100 in the database 140, such as e.g. a reminder to check the animal 100 in question later, to select the exception animal 100 for sorting, etc.

Figure 3A:
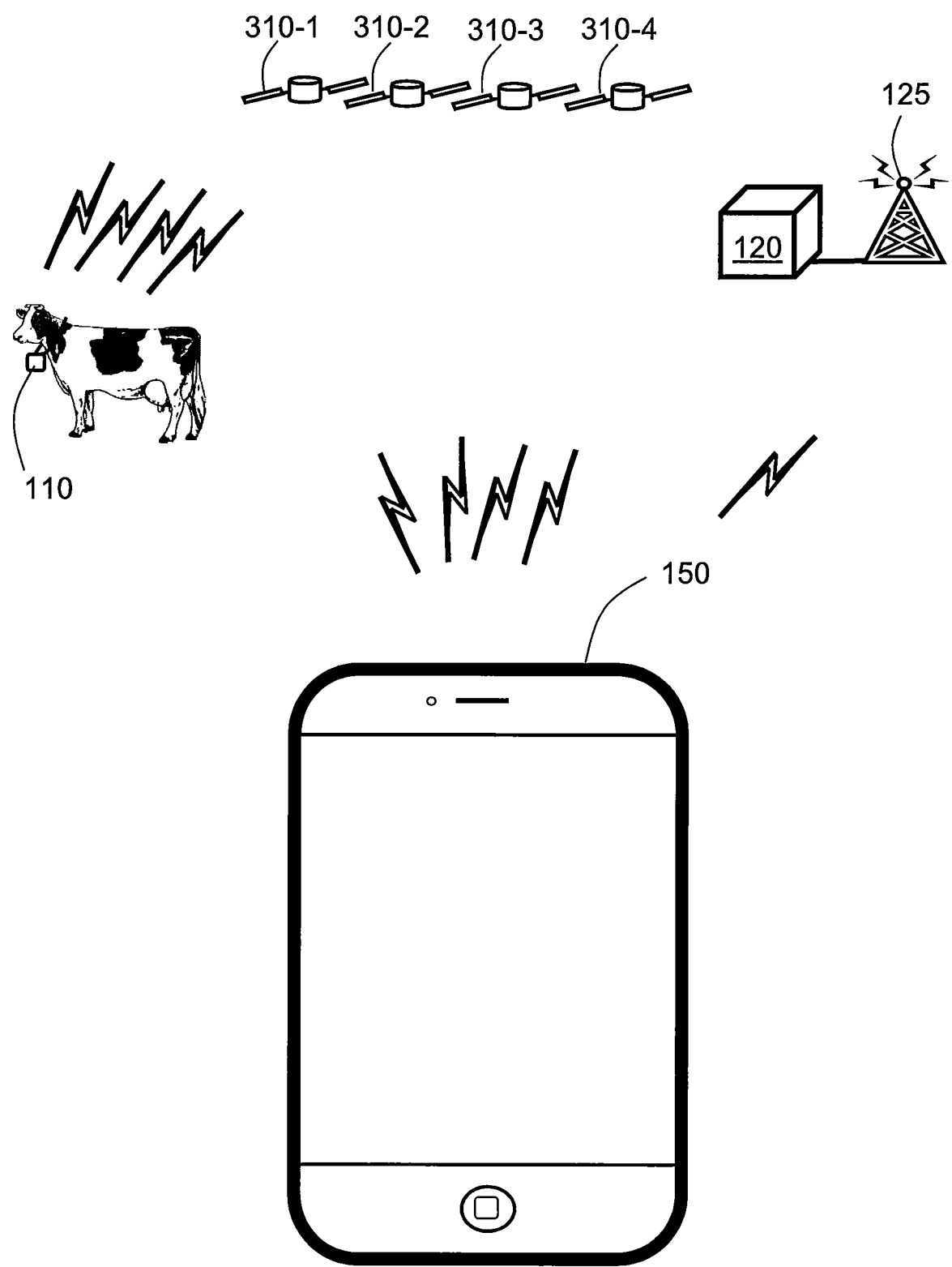
FIG. 3A illustrates an example of localisation of an exception animal and a UE, according to an embodiment of the invention.
Figure 3B:
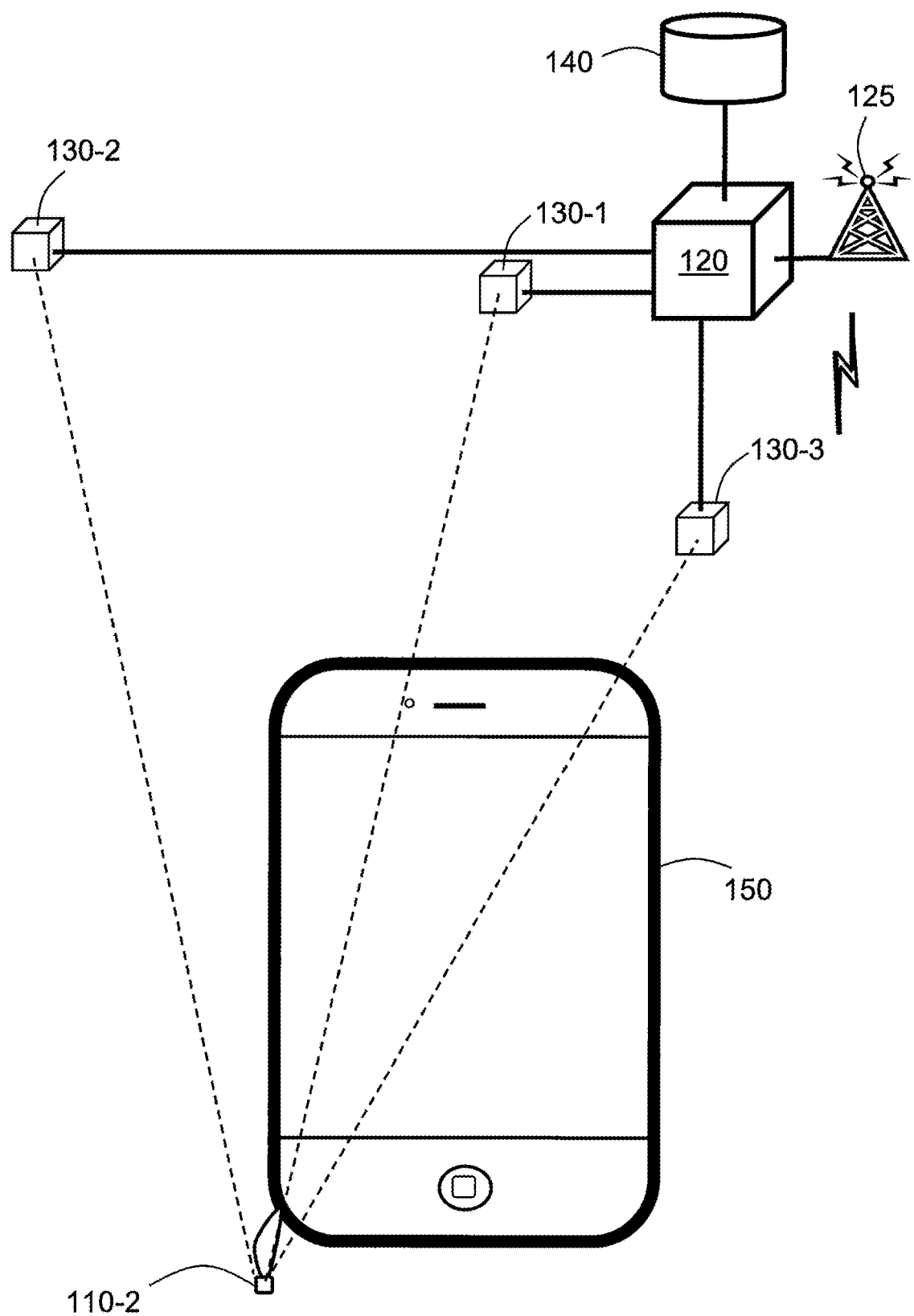
FIG. 3B illustrates another example of localisation of an exception animal and a UE, according to an embodiment of the invention.

FIG. 3A illustrates an alternative localisation method for the exception animal 100, and/or the UE 150, which may be utilised e.g. when the animal is outside, or in a farm where he/she is enabled to move both inside and outside the barn.

In an embodiment, the exception animal 100 may carry a GPS receiver, e.g. in a necklace around the neck of the animal 100, surgically implanted under the hide, as an ear tag and/or around any of the legs.

The geographical position of the GPS receiver, (and thereby also of the exception animal 100), as well as time, velocity, heading, etc., may be determined continuously, or at a certain predetermined or configurable time interval according to various embodiments.

Positioning by satellite navigation is based on distance measurement using triangulation from a number of satellites 310-1, 310-2, 310-3, 310-4, which typically may be geostationary. In this example, four satellites 310-1, 310-2, 310-3, 310-4 are depicted, but this is merely an example. More than four satellites 310-1, 310-2, 310-3, 310-4 may be used for enhancing the precision, or for creating redundancy. The satellites 310-1, 310-2, 310-3, 310-4 continuously transmit information about time and date (for example, in coded form), identity (which satellite 310-1, 310-2, 310-3, 310-4 that broadcasts), status, and where the satellite 310-1, 310-2, 310-3, 310-4 are situated at any given time. The GPS satellites 310-1, 310-2, 310-3, 310-4 sends information encoded with different codes, for example, but not necessarily based on Code Division Multiple Access (CDMA). This allows information from an individual satellite 310-1, 310-2, 310-3, 310-4 distinguished from the others' information, based on a unique code for each respective satellite 310-1, 310-2, 310-3, 310-4. This information can then be transmitted to be received by the appropriately adapted GPS receiver carried by the animal 100.

Distance measurement can according to some embodiments comprise measuring the difference in the time it takes for each respective satellite signal transmitted by the respective satellites 310-1, 310-2, 310-3, 310-4 to reach the GPS receiver of the exception animal 100. As the radio signals travel at the speed of light, the distance to the respective satellite 310-1, 310-2, 310-3, 310-4 may be computed by measuring the signal propagation time.

The positions of the satellites 310-1, 310-2, 310-3, 310-4 are known, as they continuously are monitored by approximately 15-30 ground stations located mainly along and near the earth's equator. Thereby the geographical position, i.e. latitude and longitude, of the exception animal 100 may be calculated by determining the distance to at least three satellites 310-1, 310-2, 310-3, 310-4 through triangulation.

Having determined the geographical position of the GPS receiver of the exception animal 100, the geographical position may be provided to the control unit 120, together with a unique identification reference of the exception animal 100 via a wireless communication interface as previously described and exemplified. The control unit 120 may then match the obtained geographical position of the exception animal 100 with an obtained geographical position of the UE 150. When the distance between the exception animal 100 and the UE 150 is shorter than a predetermined or configurable threshold limit, an indication confirming the presence of the exception animal 100 may be outputted on the UE 150 as previously described.

The threshold limit may in a non-limiting example be set to e.g. 2 meters, 5 meters, 10 meters, or any value in between. The threshold limit may also be set to a distance exceeding meters in some embodiments.

FIG. 3B illustrates an alternative localisation method for the UE 150. In this embodiment, another locational device 110-2 may be associated with the UE 150 and carried together with the UE 150, e.g. by the human.

Thereby, the control unit 120 may determine the position of the UE 150/human as previously described in conjunction with positioning of the exception animal 100 and the locational device 110 attached thereto.

The control unit 120 may determine the position of the exception animal 100 based on the localisation described in conjunction with the description of any of the previously described figures.

Figure 3C:
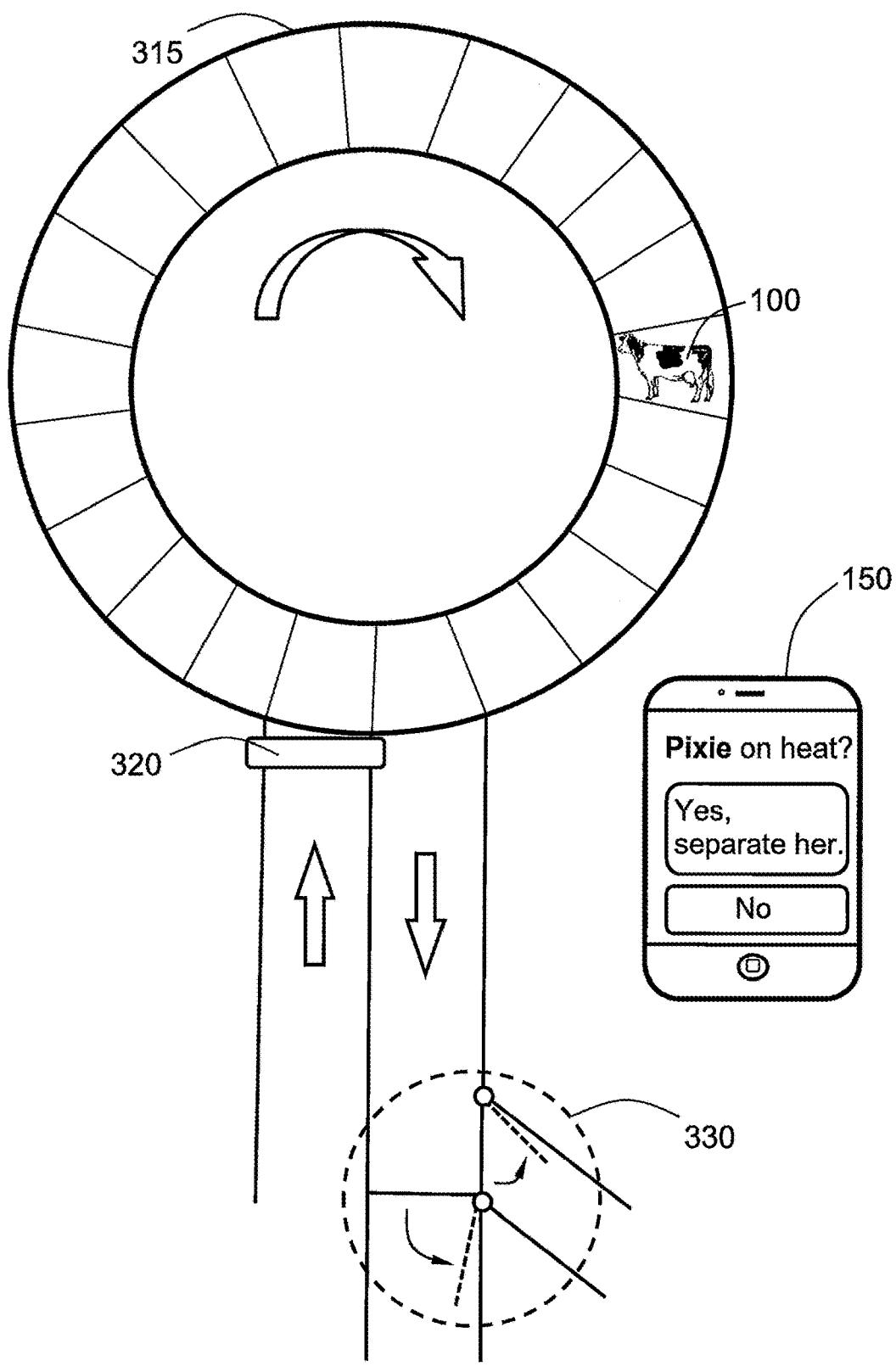
FIG. 3C illustrates a further example of localisation of an exception animal and a UE, according to an embodiment of the invention.

FIG. 3C illustrates an alternative localisation method for the exception animal 100.

The locational device 110 of the exception animal 100 may be detected by a receiver 320, situated at a known localisation, e.g. over a short range wireless signal such as Radio-Frequency Identification (RFID), Bluetooth, ZigBee, infrared transmission, Wi-Fi, Light Fidelity (Li-Fi), ANT+, Near Field Communication (NFC), Z-Wave, Wireless Universal Serial Bus (Wireless USB), etc.

The determined position of the locational device 110/ exception animal 100 may be provided by the receiver 320 to the control unit 120 via a wired or wireless communication interface.

The receiver 320 may be situated e.g. at the entrance to a rotary platform 315. As the rotary velocity of the rotary platform 315 or the position of the rotary platform 315 is continuously known by the control unit 120, the precise position of the locational device 110/exception animal 100 may be estimated by the control unit 120.

In case that the control unit 120 detects that the UE 150 is situated within a distance shorter than the threshold limit from the exception animal 100, an indication confirming the presence of the exception animal 100 may be outputted on the UE 150 as previously described. In some embodiments, after having checked the state of the exception animal 100, the human may return a command to the control unit 120 to perform an action, based on the confirmed state of the exception animal 100, such as e.g. separating her from the herd for insemination by remote control of a sorting gate 330.

Figure 4A:
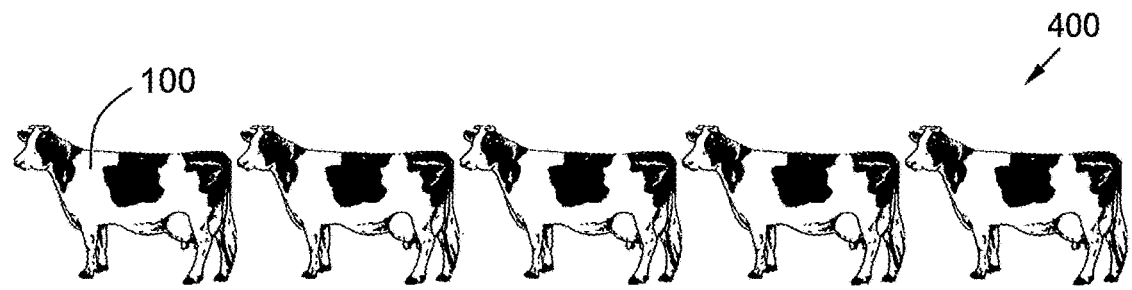
FIG. 4A illustrates an example of localisation of an exception animal, according to an embodiment of the invention.
Figure 4A:
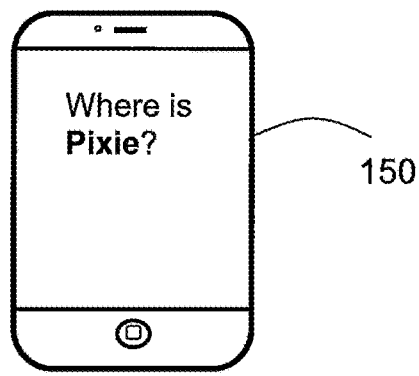
Figure 4B:
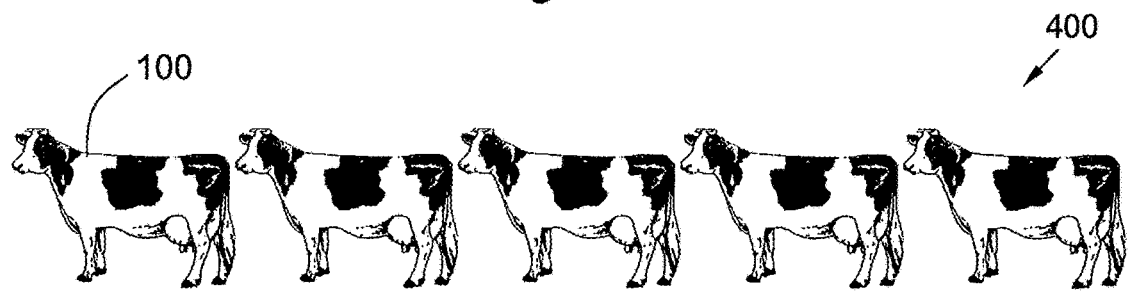
FIG. 4B illustrates an example of localisation of an exception animal, according to an embodiment of the invention.
Figure 4B:
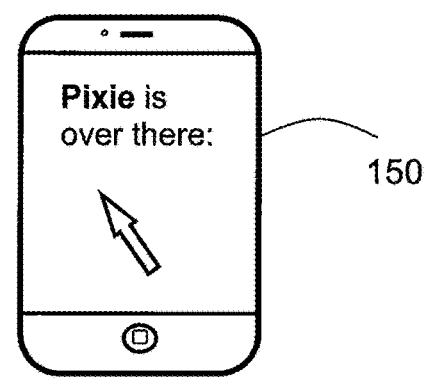

FIG. 4A-4B illustrate an alternative embodiment, wherein the human desires to find a particular animal 100 of the herd 400. The herd 400 may comprise hundreds, or thousands of animals, making it difficult for the human to instantly find a particular animal 100, without extensive search time.

The human may want to find the animal 100 in order to perform a check, e.g. when a veterinary is visiting the farm.

In the illustrated arbitrary and non-limiting example, the human is looking for "Pixie", and enters a request to the control unit 120 to provide an indication of the location of her.

The control unit 120 may then determine the location of the desired individual animal 100 according to any of the previously described methods for localisation. The control unit 120 may also obtain the geographical position of the UE 150 according to any of the previously described methods. The control unit 120 may then calculate the distance between the UE 150 and the requested animal 100; and/or the direction from the UE 150 to the animal 100. The result of this calculation may then be provided to the UE 150 and outputted over a user interface as previously exemplified.

Thereby for example distance and/or direction from the UE 150 to the requested animal 100. In some embodiments, the position of the animal 100 may be indicated on a map of the barn, for example.

Figure 5:
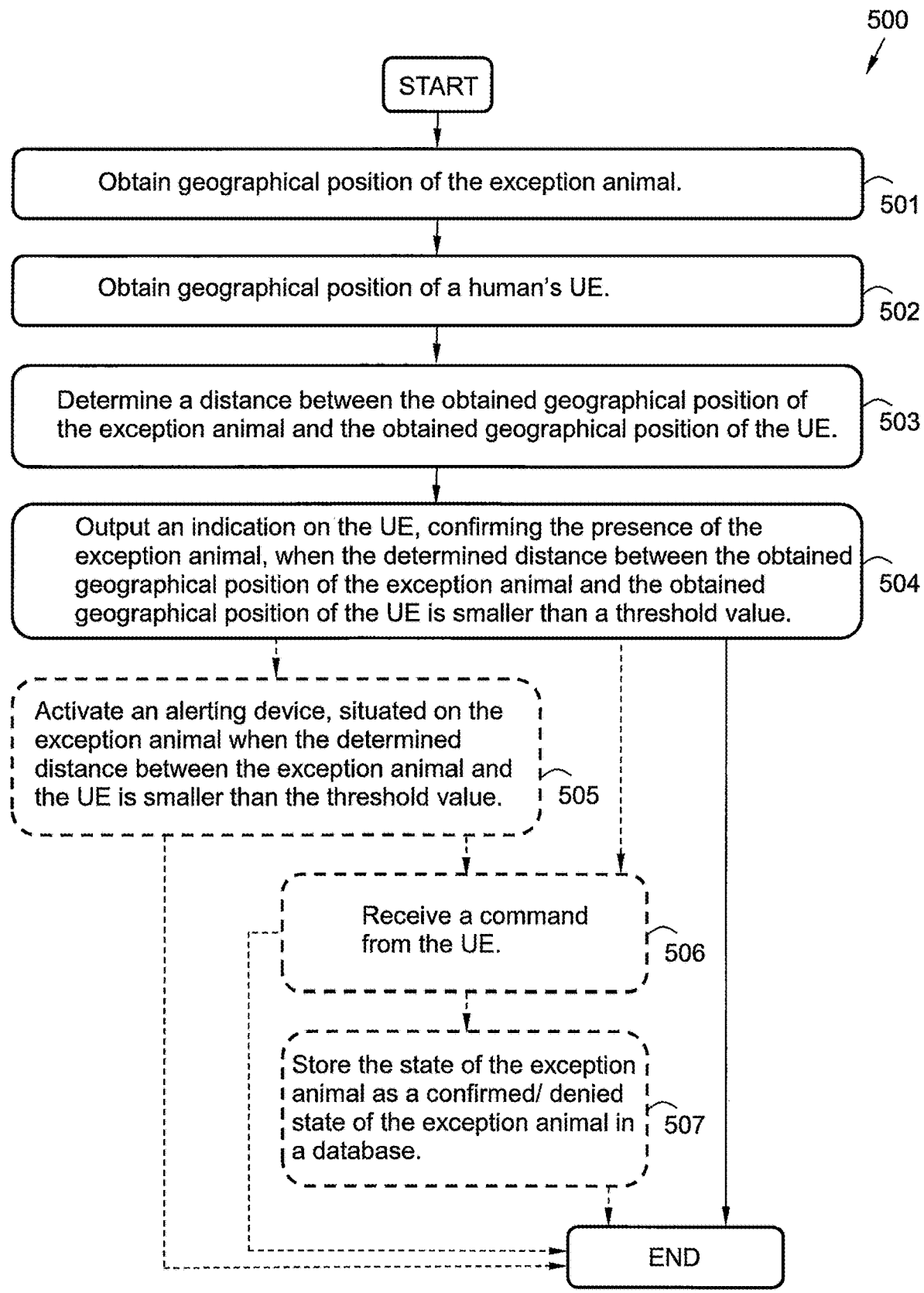
FIG. 5 is a flow chart illustrating an embodiment of a method.

FIG. 5 illustrates an example of a method 500 according to an embodiment. The flow chart in FIG. 5 shows the method 500 executed in a control unit 120 of a system for assisting a human in detecting an exception animal 100, for which an abnormal measurement value has been detected by the control unit 120.

The control unit 120 may detect an abnormal measurement value of the exception animal 100 based on e.g. monitoring of milk yields, movement activities, rumination, feed intake, etc. of the particular animal 100. In some embodiments, a sensor may be attached to the animal 100 for measuring various parameters of the animal 100 such as body temperature, movement activities, etc., which may be provided to the control unit 120.

In order to correctly assist the human in detecting the exception animal 100, the method 500 may comprise a number of steps 501-507. However, some of these steps 501-507 may be performed solely in some alternative embodiments, like e.g. steps 505-507. Further, the described steps 501-507 may be performed in a somewhat different chronological order than the numbering suggests; step 502 may for example be performed before, or simultaneously with step 501. The method 500 may comprise the subsequent steps:

Step 501 comprises obtaining a geographical position of the exception animal 100.

The geographical position of the exception animal 100 may be obtained based on a locational device 110 attached to the exception animal 100 in some embodiments.

Step 502 comprises obtaining a geographical position of a User Equipment (UE) 150 of the human.

The geographical position of the UE 150 of the human may be obtained based on a satellite navigation system.

Step 503 comprises determining a distance between the obtained 501 geographical position of the exception animal 100 and the obtained 502 geographical position of the UE 150.

Step 504 comprises outputting an indication on the UE 150, confirming the presence of the exception animal 100, when the determined 503 distance is smaller than a threshold limit.

The outputted indication on the UE 150 may comprise an identification of the exception animal 100, a direction from the UE 150 to the exception animal 100 and/or the determined 503 distance between the UE 150 and the exception animal 100.

In some alternative embodiments, the indication may be outputted on the UE 150 i.e. by an audio signal, a voice message, a tactile signal, a visual message on the display, or a combination thereof.

Step 505 may be performed only in some particular embodiments. The optional step 505 comprises activating an alerting device 200 situated on the exception animal 100 when the determined 503 distance between the obtained 501 geographical position of the exception animal 100 and the obtained 502 geographical position of the UE 150 is smaller than the threshold limit.

Step 506, which may be performed only in some particular embodiments, comprises receiving a command from the user equipment 150.

The received command may comprise e.g. a confirmation, or alternatively a denial, of the state of the exception animal 100.

Step 507, which may be performed only in some particular embodiments wherein step 506 has been performed, comprises storing the state of the exception animal 100 as a confirmed, or alternatively denied in a database 140, when receiving 506 the command.

Figure 6:
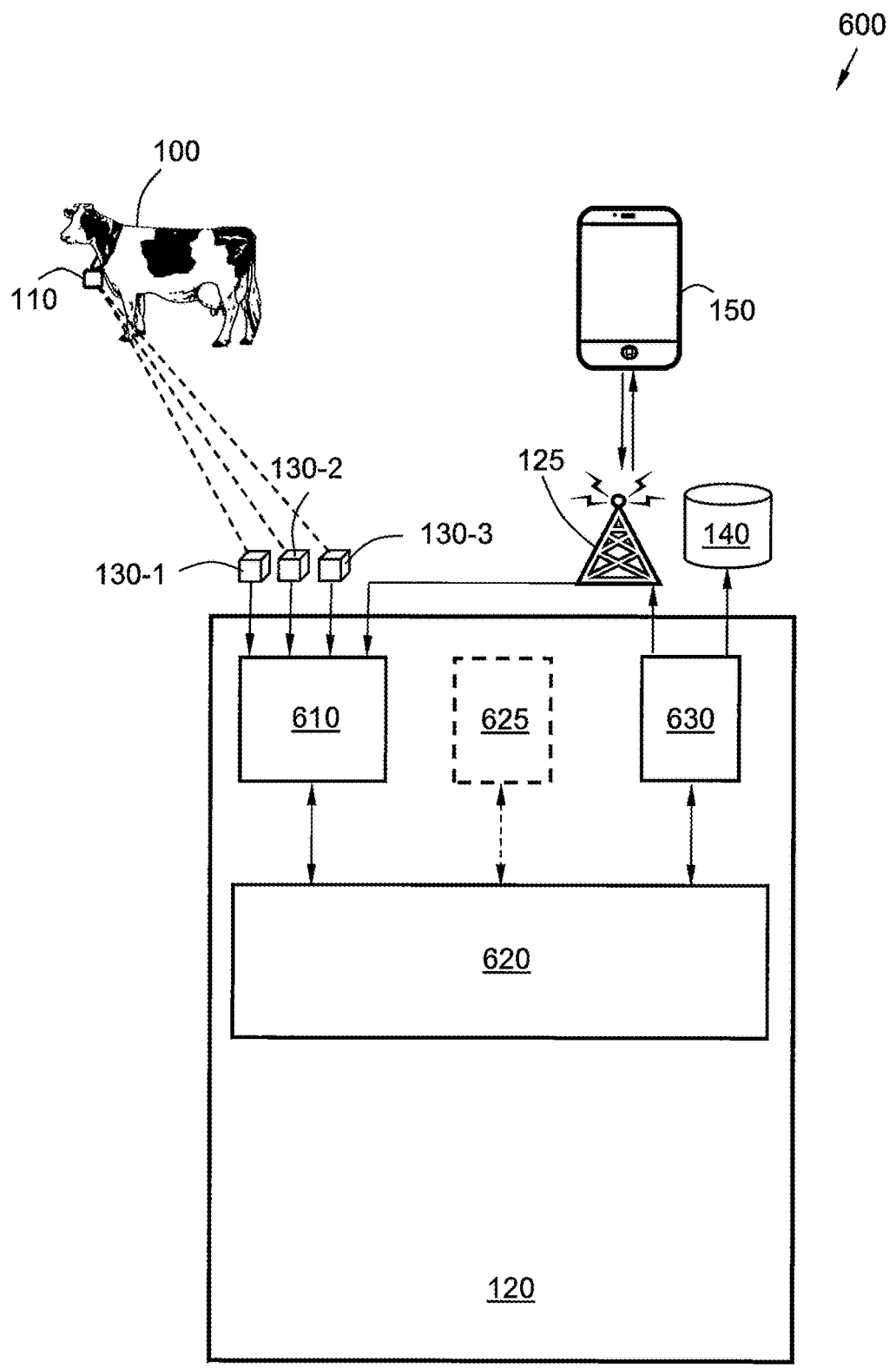
FIG. 6 is an illustration depicting a system according to an embodiment.

FIG. 6 illustrates an embodiment of a system 600 for assisting a human in detecting an exception animal 100, for which an abnormal measurement value has been detected. The system 600 may perform at least some of the previously described steps 501-507 according to the method 500 described above and illustrated in FIG. 5.

The system 600 comprises a control unit 120. The control unit 120 is configured to obtain a geographical position of the exception animal 100. Further, the control unit 120 is configured to obtain a geographical position of a UE 150 of the human. The control unit 120 is also configured to determine a distance between the obtained geographical position of the exception animal 100 and the obtained geographical position of the UE 150. Furthermore, the control unit 120 is configured to generate a command signal to the UE 150 to output an indication confirming the presence of the exception animal 100, when the determined distance is smaller than a threshold limit.

The system 600 may further comprise a set of wireless signal receivers 130-1, 130-2, 130-3, configured to receive wireless signals from a locational device 110 attached to the exception animal 100.

The control unit 120 may be further configured to determine the geographical position of the UE 150 of the human based on a satellite navigation system. Optionally, the control unit 120 may be further configured to generate a command signal to activate an alerting device 200, situated on the exception animal 100, when the determined distance between the exception animal 100 and the UE 150 is smaller than the threshold limit.

The system 600 may further comprise a transceiver 125, configured to receive a command from the UE 150. The received command may comprise a confirmation, or alternatively a denial, of the state of the exception animal 100, in some embodiments. Further, according to some optional embodiments, the received command comprises a selection of the exception animal 100 for sorting.

The system 600 may in some embodiments comprise a database 140, configured to store information concerning the exception animal 100.

The control unit 120 may comprise a receiver 610 configured for receiving information from the set of wireless signal receivers 130-1, 130-2, 130-3 and/or the transceiver 125.

The control unit 120 comprises a processing circuit 620 configured for performing various calculations for conducting the method 500 according to at least some of the previously described steps 501-507.

Such processing circuit 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 120 may comprise a memory 625 in some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. The memory 625 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 120 may comprise a signal transmitter 630. The signal transmitter 630 may be configured for transmitting signals via a wired or wireless communication interface to the transceiver 125 and/or the database 140.

However, in some alternative embodiments, the system 600 may comprise additional units for performing the method 500 according to steps 501-507.

The above described steps 501-507 to be performed in the system 600 may be implemented through the one or more processing circuits 620 within the control unit 120, together with a computer program for performing at least some of the functions of the steps 501-507. Thus the computer program comprises instructions which, when the computer program is executed by the control unit 120 in the system 600, cause the control unit 120 to carry out the method 500 according to at least some of steps 501-507.

The computer program mentioned above may be provided for instance in the form of a computer-readable medium, i.e. a data carrier carrying computer program code for performing at least some of the steps 501-507 according to some embodiments when being loaded into the one or more processing circuits 620 of the control unit 120. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 120 remotely, e.g. over an Internet or an intranet connection.

The terminology used in the description of the embodiments as illustrated in the accompanying drawings is not intended to be limiting of the described method 500; the control unit 120; the computer program; the system 600 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A system (600) for assisting a human in detecting an exception animal (100) for which an abnormal measurement value has been detected, the system comprising:
    a database (140), configured to store information concerning a plurality of animals; and
    a control unit (120), including a processing circuit and a wireless communications interface in connection with the processing circuit, the processing circuit configured to cause the control unit to:
        obtain a geographical position of the exception animal (100),
        obtain a geographical position of a user equipment (150) of the human,
        determine a distance between the obtained geographical position of the exception animal (100) and the obtained geographical position of the user equipment (150), and
        upon a determination that the determined distance is smaller than a predetermined threshold, generate a command signal to the user equipment (150) that causes the user equipment (150) to output an indication of the presence of the exception animal (100),
    wherein the processing circuit of the control unit (120) is further configured to determine an animal of said plurality of animals as being the exception animal when said animal satisfies one or more conditions based on said information stored in the database, and
    wherein the processing circuit of the control unit (120) is yet further configured
        to transmit, to the user equipment (150) with the command signal, information of a state of the exception animal, said state concerning at least one of whether the exception animal is in heat or whether the exception animal is ill, and a command that causes the user equipment to prompt the user for a reply concerning said state of the exception animal,
        to receive from the user equipment (150) a reply that comprises one of a confirmation and a denial of said state of the exception animal, and
        to store the reply received by the user equipment (150) in association with a unique identity reference of the exception animal (100) in the database (140).

2. The system (600) according to claim 1, further comprising:
    a plurality of wireless signal receivers (130-1, 130-2, 130-3), each of said wireless signal receivers configured to receive wireless signals from a locational device (110) attached to the exception animal (100).

3. The system (600) according to claim 2, further comprising:
    an alerting device (200) situated on the exception animal (100),
    wherein the processing circuit of the control unit (120) is further configured to generate a command signal to activate the alerting device (200) upon the determination that the determined distance between the exception animal (100) and the user equipment (150) is smaller than the predetermined threshold.

4. The system (600) according to claim 1, further comprising:
an alerting device (200) situated on the exception animal (100),
wherein the processing circuit of the control unit (120) is further configured to generate a command signal to activate the alerting device (200) upon the determination that the determined distance between the exception animal (100) and the user equipment (150) is smaller than the predetermined threshold.

5. The system (600) according to claim 1, wherein the indication output to the user equipment (150) causes the user equipment to indicate to the human at least one of an identification of the exception animal (100), a direction from the user equipment (150) to the exception animal (100) and the determined (503) distance between the user equipment (150) and the exception animal (100).

6. The system (600) according to claim 1, further comprising:
plural fixed base stations located at known positions, wherein the user equipment (150) of the human comprises a sensor that interacts with the plural fixed base stations to thereby obtain the geographical position of the user equipment (150).

7. The system (600) according to claim 1, wherein the reply comprising the confirmation includes a command to the control unit (120) for performing an action for sorting the exception animal.

8. A method (500) executed by a processing circuit of a control unit (120) of a system (600) for assisting a human in detecting an exception animal (100) for which an abnormal measurement value has been detected comprising:
determining, via information in a database having information stored therein concerning a plurality of animals, that an animal of said plurality of animals is the exception animal when said animal satisfies one or more conditions based on said stored information;
obtaining (501) a geographical position of the exception animal (100);
obtaining (502) a geographical position of a user equipment (150) of the human;
determining (503) a distance between the obtained (501) geographical position of the exception animal (100) and the obtained (502) geographical position of the user equipment (150);
alerting the human using the user equipment that the human is in a vicinity of the exception animal, by
i) comparing the distance to a predetermined threshold, and
ii) upon a result from said comparing that the distance is smaller than the predetermined threshold, automatically outputting (504) an indication to the user equipment (150) that causes the user equipment to generate an alert for the human of the user equipment of the presence of the exception animal (100), the alert including information of a state of the exception animal, said state concerning at least one of whether the exception animal is in heat or whether the exception animal is ill, and a prompt for the user for transmitting a reply to the control unit that comprises one of a confirmation and a denial of said state of the exception animal; and
receiving the reply from the user equipment via the wireless communications interface, and storing the reply received by the user equipment (150) in association with a unique identity reference state of the exception animal (100) in the database (140).

9. The method (500) according to claim 8,
wherein the geographical position of the user equipment (150) of the human is obtained (502) based on a satellite navigation system.

10. The method (500) according to claim 8, wherein the indication that is output to the user equipment (150) causes the user equipment to indicate to the human at least one of an identification of the exception animal (100), a direction from the user equipment (150) to the exception animal (100) and the determined (503) distance between the user equipment (150) and the exception animal (100).

11. The method (500) according to claim 8, further comprising:
activating (505) an alerting device (200) situated on the exception animal (100) upon the result from said comparing that the distance is smaller than the predetermined threshold.

12. A computer-readable medium having stored thereon a computer program comprising instructions that, when the computer program is executed by a control unit (120) in a system (600), causes the control unit (120) to carry out the method (500) according to claim 8.

13. The method (500) according to claim 8, wherein the geographical position of the exception animal (100) is obtained (501) by use of a locational device (110), attached to the exception animal (100) and configured to operate with a set of wireless signal receivers (130-1, 130-2, 130-3) configured to receive wireless signals from the locational device (110).

14. The method (500) according to claim 8, wherein the reply comprising the confirmation includes a command to the control unit (120) for performing an action for sorting the exception animal.

* * * * *